US012552921B2

(12) United States Patent
Patel et al.

(10) Patent No.: US 12,552,921 B2
(45) Date of Patent: Feb. 17, 2026

(54) FILMS INCLUDING POST CONSUMER RESIN

(71) Applicant: Dow Global Technologies LLC, Midland, MI (US)

(72) Inventors: Rajen M. Patel, Freeport, TX (US); Carol L. Tsai, Lake Jackson, TX (US); Daniel G. Abebe, Lake Jackson, TX (US); Yongchao Zeng, Houston, TX (US); Teresa P. Karjala, Lake Jackson, TX (US); Xiaofei Sun, Pearland, TX (US); Jessica L. Rogers, Lake Jackson, TX (US); Francis O. Olajide, Jr., Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 345 days.

(21) Appl. No.: 17/904,980

(22) PCT Filed: Apr. 7, 2021

(86) PCT No.: PCT/US2021/026151
§ 371 (c)(1),
(2) Date: Aug. 25, 2022

(87) PCT Pub. No.: WO2021/207342
PCT Pub. Date: Oct. 14, 2021

(65) Prior Publication Data
US 2023/0105510 A1    Apr. 6, 2023

Related U.S. Application Data

(60) Provisional application No. 63/008,193, filed on Apr. 10, 2020.

(51) Int. Cl.
*C08L 23/06* (2006.01)
*C08J 5/18* (2006.01)

(52) U.S. Cl.
CPC ............. *C08L 23/06* (2013.01); *C08J 5/18* (2013.01); *C08J 2323/06* (2013.01);
(Continued)

(58) Field of Classification Search
CPC ............ C08J 2300/30; C08J 2323/04; C08J 2323/06; C08J 2400/26; C08J 2423/06;
(Continued)

(56) References Cited

U.S. PATENT DOCUMENTS 3,645,992 A   2/1972   Elston
5,272,236 A   12/1993  Lai et al.
(Continued)

FOREIGN PATENT DOCUMENTS

CN   104163967 A   11/2014
JP   2005015677    1/2005
(Continued)

OTHER PUBLICATIONS

LDPE/ EVA Modified Film Prepared by Melt Blend Method and Study of Its Mechanical Performances and Barrier Property (Year: 2011).*
(Continued)

*Primary Examiner* — Yan Lan
(74) *Attorney, Agent, or Firm* — Jacob R. Graham

(57) ABSTRACT

Provided are films made from polymer blends including post-consumer resin (PCR). The films are formed from a polymer blend that includes a PCR, a low density polyethylene and/or ethylene/carbon monoxide copolymer (ECO copolymer), and a modification agent. The films, which include a PCR, contribute to improved sustainability and in aspects maintain or minimize the reduction of desirable properties, such as elastic recovery.

9 Claims, 2 Drawing Sheets

(52) U.S. Cl.
CPC ........ *C08J 2423/06* (2013.01); *C08J 2423/08* (2013.01); *C08J 2423/16* (2013.01); *C08L 2203/162* (2013.01); *C08L 2205/025* (2013.01); *C08L 2205/035* (2013.01); *C08L 2207/066* (2013.01); *C08L 2207/20* (2013.01)

(58) Field of Classification Search
CPC .............. C08J 2423/08; C08J 2423/16; C08J 2473/00; C08J 5/18; C08L 2203/16; C08L 2203/162; C08L 2205/025; C08L 2205/035; C08L 2207/066; C08L 2207/20; C08L 23/04; C08L 23/06; C08L 23/0815; C08L 23/0853; C08L 23/0892; C08L 2205/03; C08L 73/00; Y02W 30/62; Y02D 30/70

See application file for complete search history.

(56) References Cited

U.S. PATENT DOCUMENTS

| | | | |
|---|---|---|---|
| 5,278,272 | A | 1/1994 | Lai et al. |
| 5,685,128 | A | 11/1997 | Chum et al. |
| 9,523,015 | B2 | 12/2016 | Karjala et al. |
| 2012/0289645 | A1* | 11/2012 | Tice ............................ C08J 5/18 524/502 |
| 2015/0203643 | A1 | 7/2015 | Alric et al. |
| 2017/0015801 | A1 | 1/2017 | Wang et al. |

FOREIGN PATENT DOCUMENTS

| | | |
|---|---|---|
| JP | 2005023190 | 1/2005 |
| WO | 2011071843 | 6/2011 |
| WO | 2013075241 A1 | 5/2013 |
| WO | 2017076933 A1 | 5/2017 |
| WO | 2019091887 A1 | 5/2019 |
| WO | 2019240899 A1 | 12/2019 |
| WO | WO 2020/229932 * | 11/2020 |
| WO | 2021074697 A1 | 4/2021 |

OTHER PUBLICATIONS

Melting and Crystallization Behavior of Linear Low-Density Polyethylene (Year: 2004, Feng).*
Chen, "Compatibilizing agents in polymer blends: Interfacial tension, phase morphology, and mechanical properties", Polymer Engineering and Science, 1993, pp. 923-930.
Turi, "Thermal Characterization of Polymeric Materials", Academic Press, 1981.
Utracki, "Compatibilization of Polymer Blends", Canadian Journal of Chemical Engineering, 2002, vol. 80, No. 6, pp. 1010-1011.
PCT/US2021/026151, International Search Report and Written Opinion with a mailing date of Aug. 8, 2021.
Salem, "Study of the degradation profile for virgin linear low-density polyethylene (LLDPE) and polyolefin (PO) plastic waste blends", Journal of material cycles and waste management, 2019, pp. 1106-1122.
Changming, "Handbook of Plastic Application Technology" 2013, pp. 270-271.
HONGXIA "Wire and Cable Materials: Structure. Performance. Application" China Machine Press, 2012, p. 273.

* cited by examiner

2nd Heat

2nd Heat

FILMS INCLUDING POST CONSUMER RESIN

TECHNICAL FIELD

Embodiments of the present disclosure generally relate to films made from a polymer blend comprising a post consumer resin (PCR).

INTRODUCTION

Post consumer resin (PCR) plays an increasingly larger role in environmental sustainability initiatives and efforts in today's world. PCR provides a way for industries to re-process and re-incorporate materials into consumer articles, which limits the consumption of new resources, permits the re-use of old materials, and sustainably creates the production of new articles. The novelty and inherent variability of PCR presents challenges to industries striving to use PCR in effective ways. PCR typically consists of a mélange of materials (e.g., polymer blends, organic, or inorganic material). As a result, PCR and its properties can have a high degree of variability in each lot, batch, or individual resin, and its precise constituents, composition, and corresponding characteristics and properties often fluctuate. It can therefore be difficult to diagnose or predict how polymer blends incorporating PCR will perform or react, and so it can be challenging to effectively incorporate PCR to produce consumer articles with uniform, validated, or desirable characteristics. For example, PCR rich in polymeric material is a prime candidate for film or sheet applications, but such films or sheets, when formed from a polymer blend including PCR, can be compromised on properties, such as elastic recovery, stiffness, or photodegradability.

Accordingly, there remains a need for sustainable and efficiently produced films that include PCR while maintaining or minimizing the reduction of other desirable properties, such as elastic recovery, stiffness, or photodegradability.

SUMMARY

Embodiments of the present disclosure provide a film that includes a significant amount of PCR (e.g., from 10 wt. % to 70 wt. %) and that in aspects maintains or minimizes reduction of other properties such as elastic recovery, stiffness, or photodegradability. For example, the film according to embodiments of the present disclosure includes a PCR that can fluctuate in percent crystallinity. This fluctuation can negatively impact film properties (e.g., elastic recovery), but the disclosed film's specific formulation that includes a modification agent (e.g., an ethylene-based plastomer or elastomer) as well as an ethylene/carbon monoxide copolymer (ECO copolymer) and/or low density polyethylene maintains or minimizes reduction of these film properties, despite the challenges presented by the incorporation of PCR and a modification agent in the polymer blend. Such films encourage sustainability while delivering effective performance.

Disclosed herein is a film formed from a polymer blend. In particular, disclosed is a film made from a polymer blend, the polymer blend comprising: (i) from 10 to 70 wt. % of a post-consumer resin (PCR); (ii) from 10 wt. % to 87 wt. % of a low density polyethylene, an ethylene/carbon monoxide copolymer (ECO copolymer), or a combination thereof; and (iii) from 3 to 25 wt. % of a modification agent.

Additional features and advantages of the embodiments will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing and the following description describes various embodiments and are intended to provide an overview or framework for understanding the nature and character of the claimed subject matter. The accompanying figures are included to provide a further understanding of the various embodiments, and are incorporated into and constitute a part of this specification.

DETAILED DESCRIPTION

Figure 1:
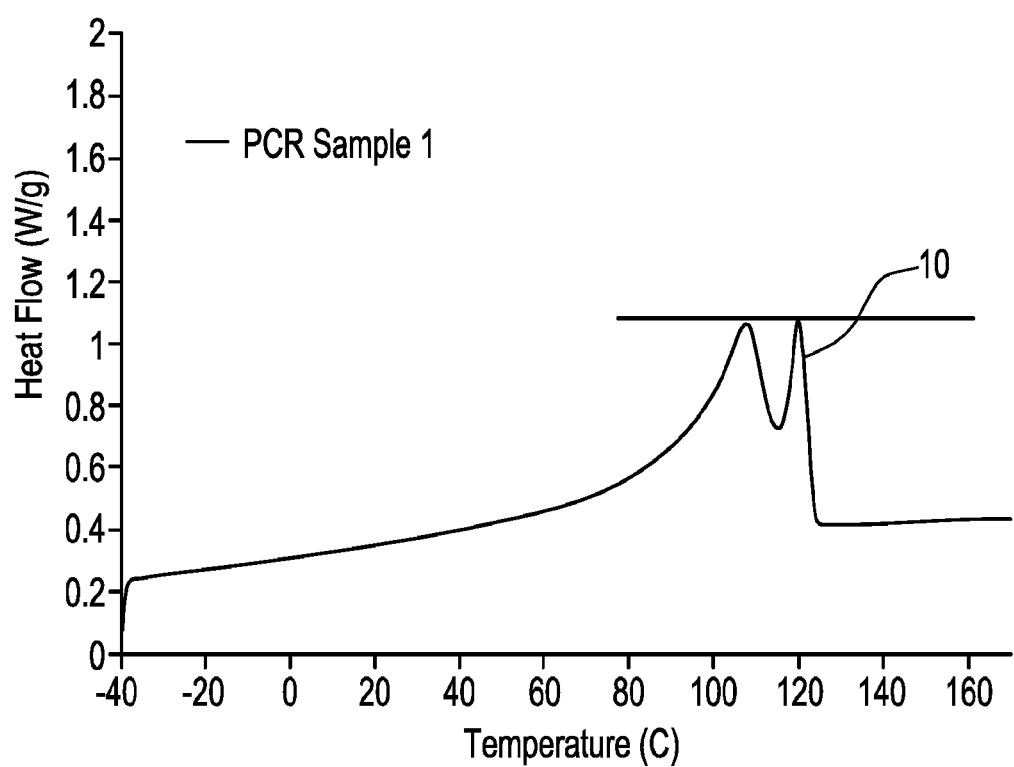
FIG. 1 is a DSC second heating curve of a PCR sample.

Aspects of the disclosed film or sheet are described in more detail below. The film according to embodiments of the present disclosure is a film or sheet (i.e., the term film or films, as used herein, includes a sheet or sheets). The films including PCR can be used to form unitizing films, shrink films, lamination films, liner films, consumer bags, agriculture films, food packaging films, beverage packaging films, or shipping sacks. It is noted however, that this is merely an illustrative implementation of the embodiments disclosed herein. The embodiments are applicable to other technologies that are susceptible to similar problems as those discussed above.

As used herein, the terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

As used herein, the term "polymer" refers to a polymeric compound prepared by polymerizing monomers, whether of the same or a different type. The term polymer thus embraces the term homopolymer (employed to refer to polymers prepared from only one type of monomer, with the understanding that trace amounts of impurities can be incorporated into the polymer structure), and the term copolymer or interpolymer. Trace amounts of impurities (for example, catalyst residues) may be incorporated into and/or within the polymer. A polymer may be a single polymer or a polymer blend.

As used herein, the term "LDPE" or "low density polyethylene" refers to an ethylene homopolymer prepared using a free-radical, high pressure (≥100 MPa (for example, 100-400 MPa)) polymerization.

As used herein, the term "a peak melting temperature (Tm)" refers to the melting temperature peak with the highest heat flow indicated by the y-axis on a DSC second heating curve.

As used herein, the term "modification agent" refers to an ethylene-based plastomer or elastomer, or an ethylene-vinyl acetate, or a combination thereof.

Component (i) of Polymer Blend—PCR

The term "post consumer resin" (or "PCR"), as used herein, refers to a polymeric material that includes materials previously used in a consumer or industry application. PCR is typically collected from recycling programs and recycling plants. The PCR may include one or more of a polyethylene, a polypropylene, a polyester, a poly(vinyl chloride), a polystyrene, an acrylonitrile butadiene styrene, a polyamide, an ethylene vinyl alcohol, an ethylene vinyl acetate, or a poly-vinyl chloride. The PCR may include one or more contaminants. The contaminants may be the result of the polymeric material's use prior to being repurposed for reuse. For example, contaminants may include paper, ink, food residue, or other recycled materials in addition to the polymer, which may result from the recycling process.

PCR is distinct from virgin polymeric material. A virgin polymeric material does not include materials previously used in a consumer or industry application. Virgin polymeric material has not undergone, or otherwise has not been subject to, a heat process or a molding process, like a typical PCR. The physical, chemical, and flow properties of PCR resins differ when compared to virgin polymeric resin, which in turn can present challenges to incorporating PCR into formulations for commercial use.

In embodiments, the PCR comprises low density polyethylene, linear low density polyethylene, or a combination thereof. In embodiments, the PCR further comprises residue from its original use, such as paper, adhesive, ink, nylon, ethylene vinyl alcohol (EVOH), polyamide (PA), polyethylene terephthalate (PET), and other organic or inorganic material. Examples of PCR include AVANGARD™ NATURA PCR-LDPCR-100 ("AVANGARD™ 100") and AVANGARD™ NATURA PCR-LDPCR-150 ("AVANGARD™ 150") (PCR commercially available from Avangard Innovative LP, Houston, Texas).

In embodiments, the polymer blend comprises from 10 to 70 weight percent (wt. %) of a PCR, based on the total wt. % of the polymer blend. All individual values and subranges of from 10 to 70 wt. % are disclosed and included herein; for example, the polymer blend can comprise from 10 to 70 wt. %, from 15 to 70 wt. %, from 20 to 70 wt. %, from 45 to 70 wt. %, from 50 to 70 wt. %, from 55 to 70 wt. %, from 60 to 70 wt. %, from 65 to 70 wt. %, from 35 to 70 wt. %, from 10 to 60 wt. %, from 20 to 60 wt. %, from 30 to 60 wt. %, from 35 to 60 wt. %, from 40 to 60 wt. %, from 45 to 60 wt. %, from 50 to 60 wt. %, from 55 to 60 wt. %, from 10 to 50 wt. %, from 20 to 50 wt. %, 30 to 50 wt. %, from 35 to 50 wt. %, from 40 to 50 wt. %, from 45 to 50 wt. %, 30 to 40 wt. %, or from 35 to 40 wt. % PCR, based on the total wt. % of the polymer blend.

In embodiments, the PCR has a heat of fusion in the range of from 130 to 170 Joule/gram (J/g), measured according to the DSC test method described below. All individual values and subranges of from 130 to 170 J/g are disclosed and incorporated herein; for example, the heat of fusion of the PCR can be from 130 to 170 J/g, from 130 to 160 J/g, from 130 to 150 J/g, from 130 to 140 J/g, from 140 to 170 J/g, from 140 to 160 J/g, from 140 to 150 J/g, from 150 to 170 J/g, or from 155 to 170 J/g, when measured according to the DSC test method described below.

In embodiments, the PCR has a peak melting temperature (Tm) of from 105° C. to 127° C., when measured according to the DSC test method describe below. All individual values and subranges of from 105° C. to 127° C. are disclosed and incorporated herein; for example, the peak melting temperature (Tm) of the PCR can be from 105° C. to 125° C., 107° C. to 125° C., 109° C. to 125° C., 111° C. to 125° C., 113° C. to 125° C., 115° C. to 125° C., 117° C. to 125° C., 105° C. to 123° C., 107° C. to 123° C., 109° C. to 123° C., 111° C. to 123° C., 113° C. to 123° C., 115° C. to 123° C., 117° C. to 123° C., 119° C. to 123° C., 121° C. to 123° C., 119° C. to 127° C., 119° C. to 125° C., 119° C. to 123° C., 119° C. to 121° C., 121° C. to 125° C., 123° C. to 127° C., 123° C. to 125° C., or 125° C. to 127° C., when measured according to the DSC test method described below.

Figure 2:
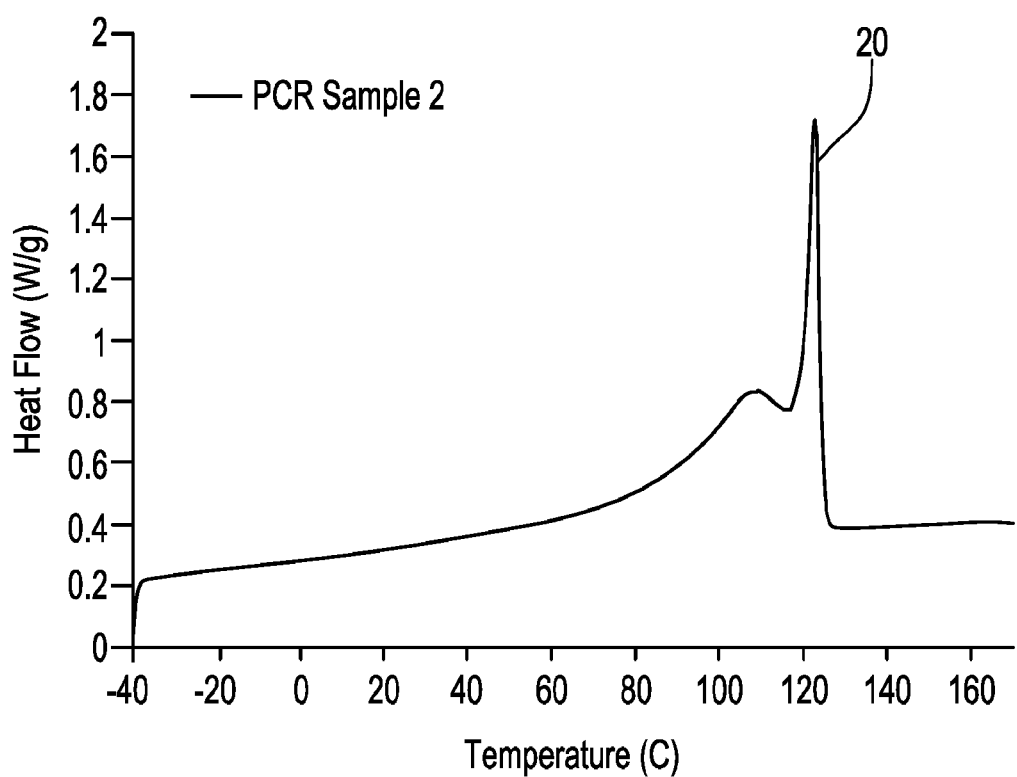
FIG. 2 is a DSC second heating curve of another PCR sample.

Referring now generally to FIG. 1, a DSC second heat curve of a PCR sample according to an embodiment of the present disclosure is shown. The polymer blend disclosed herein can include a PCR that has a DSC curve as shown in FIG. 1, where the PCR has a peak melting temperature (Tm) 10 of 120.08° C. Referring now generally to FIG. 2, a DSC second heat curve of a different PCR sample according to an embodiment of the present disclosure is shown. The polymer blend disclosed herein can include a PCR sample that has a DSC second heat curve as shown in FIG. 2, where the PCR has a peak melting temperature (Tm) 20 of 122.87° C. A person of ordinary skill in the art will appreciate how the differences in the DSC second heat curves shown in FIG. 1 to FIG. 2 demonstrate, in part, the variability in the composition and heat flow of the PCR material.

Component (ii) of Polymer Blend—LDPE and/or ECO Copolymer

In embodiments, the polymer blend comprises from 10 to 87 wt. % of a low density polyethylene, ethylene/carbon monoxide copolymer (ECO copolymer), or combination thereof, where wt. % is based on the total weight of the polymer blend. All individual values and subranges of from 10 to 87 wt. % are disclosed and included herein; for example, the polymer blend can comprise from 10 to 87 wt. %, from 20 to 87 wt. %, from 30 to 87 wt. %, from 40 to 87 wt. %, from 50 to 87 wt. %, from 60 to 87 wt. %, 10 to 67 wt. %, from 20 to 67 wt. %, from 30 to 67 wt. %, from 40 to 67 wt. %, from 50 to 67 wt. %, 10 to 60 wt. %, from 20 to 60 wt. %, from 30 to 60 wt. %, from 40 to 60 wt. %, or from 50 to 60 wt. % of a low density polyethylene, ethylene/carbon monoxide copolymer (ECO copolymer), or combination thereof, where wt. % is based on the total weight of the polymer blend.

In further embodiments, the polymer blend comprises from 10 to 87 wt. % of only a low density polyethylene (i.e., component (ii) is a low density polyethylene). In other embodiments, the polymer blend comprises from 10 to 87 wt. % of only an ECO copolymer (i.e., component (ii) is an ECO copolymer). In even further embodiments, the polymer blend comprises a combination of a low density polyethylene and an ECO copolymer. For example, in one embodiment, the polymer blend comprises from 10 to 87 wt. % of a combination of from 1 to 99 wt. % of a low density polyethylene and from 1 to 99 wt. % of an ECO copolymer, where the weight percent of the low density polyethylene and the ECO copolymer is based on the total weight percent of the combination. All individual values and subranges of from 1 to 99 wt. % are disclosed and included herein. For example, in one embodiment, where the polymer blend comprises from 10 to 87 wt. % of a combination of a low density polyethylene and an ECO copolymer, the combination of the low density polyethylene and the ECO copolymer comprises from 1 to 45 wt. % of the low density polyethylene and from 55 to 99 wt. % of the ECO copolymer, where the wt. % of the low density polyethylene and the ECO copolymer is based on the total weight of the combination.

In embodiments, the low density polyethylene of the polymer blend has a density from 0.915 g/cm$^3$ to 0.935 g/cm$^3$, where density can be measured according to ASTM D792. All individual values and subranges of from 0.915 g/cm$^3$ to 0.935 g/cm$^3$ are included and disclosed herein; for example, the density of the low density polyethylene can be from 0.915 g/cm$^3$ to 0.935 g/cm$^3$, 0.915 g/cm$^3$ to 0.933 g/cm$^3$, 0.915 g/cm$^3$ to 0.930 g/cm$^3$, 0.915 g/cm$^3$ to 0.925 g/cm$^3$, 0.915 g/cm$^3$ to 0.920 g/cm$^3$, from 0.925 g/cm$^3$ to 0.925 g/cm$^3$ from 0.920 g/cm$^3$ to 0.930 g/cm$^3$, or from 0.925 g/cm$^3$ to 0.930 g/cm$^3$, where density can be measured according to ASTM D792.

In embodiments, the low density polyethylene has a melt index ($I_2$) of from 0.15 to 70 grams/10 minutes (g/10 min), where melt index ($I_2$) can be measured in accordance with ASTM D1238 (190° C./2.16 kg). All individual values and subranges of a melt index of from 0.15 to 70 g/10 min are disclosed and include herein; for example, the low density polyethylene can have a melt index of a lower limit of 0.15, 0.20, 0.25, 0.50, 1, 2, 5, 10, 20, 30, 40, 50, or 60 g/10 min to an upper limit of 0.20, 0.25, 0.50, 1, 2, 5, 10, 20, 30, 40, 50, 60, or 70 g/10 min, where melt index ($I_2$) can be measured in accordance with ASTM D1238 (190° C./2.16 kg).

In embodiments, the ECO copolymer has a density in the range of from 0.910 to 0.990 g/cm$^3$, where density can be measured according to ASTM D792. All individual values and subranges of a density of from 0.910 to 0.990 g/cm$^3$ are disclosed and included herein; for example, the ECO copolymer can have a density in the range of from 0.910 to 0.990 g/cm$^3$, 0.920 to 0.990 g/cm$^3$, 0.930 to 0.990 g/cm$^3$, 0.940 to 0.990 g/cm$^3$, 0.950 to 0.990 g/cm$^3$, 0.960 to 0.990 g/cm$^3$, 0.970 to 0.990 g/cm$^3$, 0.980 to 0.990 g/cm$^3$, 0.910 to 0.970 g/cm$^3$, 0.920 to 0.970 g/cm$^3$, 0.930 to 0.970 g/cm$^3$, 0.940 to 0.970 g/cm$^3$, 0.950 to 0.970 g/cm$^3$, 0.960 to 0.970 g/cm$^3$, 0.910 to 0.950 g/cm$^3$, 0.920 to 0.950 g/cm$^3$, 0.930 to 0.950 g/cm$^3$, 0.940 to 0.950 g/cm$^3$, 0.910 to 0.950 g/cm$^3$, 0.920 to 0.950 g/cm$^3$, 0.930 to 0.950 g/cm$^3$, 0.940 to 0.950 g/cm$^3$, 0.910 to 0.930 g/cm$^3$, 0.920 to 0.930 g/cm$^3$, 0.925 to 0.935 g/cm$^3$, or 0.910 to 0.930 g/cm$^3$, where density can be measured according to ASTM D792.

In embodiments, the ECO copolymer has a melt index ($I_2$) in the range of from 0.15 to 100 g/10 minutes (g/10 min), where melt index ($I_2$) can be measured in accordance with ASTM D1238 (190° C./2.16 kg). All individual values and subranges of a melt index of from 0.15 to 100 g/10 minutes are disclosed and included herein; for example, the ECO copolymer can have a melt index of a lower limit of 0.15, 0.20, 0.25, 0.50, 1, 2, 3, 4, 5, 10, 20, 30, 40, 50, 60, 70, 80, or 90 g/10 min to an upper limit of 0.20, 0.25, 0.50, 1, 2, 3, 4, 5, 10, 20, 30, 40, 50, 60, 70, 80, 90, or 100 g/10 min, where melt index ($I_2$) can be measured in accordance with ASTM D1238 (190° C./2.16 kg)

In embodiments, the ECO copolymer has a carbon monoxide content of from 0.5 to 10 wt. %, where wt. % is based on the total weight of the ECO copolymer and where carbon monoxide content can be measured by $^{13}$C NMR such as disclosed in U.S. Pat. No. 9,523,015. All individual values and subranges of from 0.5 to 10 wt. % are disclosed and included herein; for example, the ECO copolymer can have a carbon monoxide content of from 0.5 to 10 wt. %, 0.5 to 8 wt. %, 0.5 to 6 wt. %, 0.5 to 4 wt. % 0.5 to 2.0 wt. %, 0.5 to 1.5 wt. %, 0.7 to 1.5 wt. %, 0.9 to 1.5 wt. %, 1.1 to 1.5 wt. %, 1.3 to 1.5 wt. %, 0.7 to 1.3 wt. %, 0.9 to 1.3 wt. %, 1.1 to 1.3 wt. %, 0.5 to 1.1 wt. %, 0.7 to 1.1 wt. %, 0.9 to 1.1 wt. %, 0.5 to 0.9 wt. %, 0.5 to 0.7 wt. %, 0.7 to 0.9 wt. %, 0.6 to 1.0 wt. %, 0.5 to 1.1 wt. % based on the total weight of the ECO copolymer, and where carbon monoxide content can be measured by $^{13}$C NMR such as disclosed in U.S. Pat. No. 9,523,015.

In embodiments, the ethylene/carbon monoxide (ECO) is formed from a high pressure, free-radical polymerization.

In embodiments, the LDPE contains an amyl (C5) group level greater than, or equal to, 0.5 amyl group per 1000 carbon atoms, as determined by $^{13}$C NMR. The amyl (C5) group level can be measured by $^{13}$C NMR such as disclosed in U.S. Pat. No. 9,523,015.

In embodiments, the ECO copolymer contains an amyl (C5) group level greater than, or equal to, 0.5 amyl group per 1000 carbon atoms, as determined by $^{13}$C NMR. The amyl (C5) group level can be measured by $^{13}$C NMR such as disclosed in U.S. Pat. No. 9,523,015.

Component (iii) of Polymer Blend—Modification Agent

In embodiments, the polymer blend comprises from 3 to 25 wt. % of a modification agent. The modification agent is an ethylene-based plastomer or elastomer, or an ethylene-vinyl acetate, or a combination thereof. In certain embodiments, the modification agent is an ethylene-based plastomer or elastomer, and the polymer blend comprises from 3 to 25 wt. % of an ethylene-based plastomer or elastomer having a density in the range of from 0.857 to 0.910 g/cm$^3$. In other embodiments, the modification agent is an ethylene-vinyl acetate, and the polymer blend comprises from 3 to 25 wt. % of an ethylene-vinyl acetate. In even further embodiments, the modification agent is a combination of an ethylene-based plastomer or elastomer and an ethylene-vinyl acetate, and the polymer blend comprises from 3 to 25 wt. % of a combination of an ethylene-based plastomer or elastomer and an ethylene-vinyl acetate.

All individual values and subranges of a polymer blend comprising from 3 to 25 wt. % of a modification agent are disclosed and included herein; for example, the polymer blend can comprise from 3 to 25 wt. %, from 5 to 25 wt. %, from 7 to 25 wt. %, from 10 to 25 wt. %, from 3 to 20 wt. %, from 5 to 20 wt. %, from 7 to 20 wt. %, from 10 to 20 wt. %, from 3 to 15 wt. %, from 5 to 15 wt. %, from 7 to 15 wt. %, from 10 to 15 wt. %, from 3 to 12 wt. %, from 5 to 12 wt. %, from 7 to 12 wt. %, or from 10 to 12 wt. % of a modification agent, based on the total weight of the polymer blend.

In embodiments, the polymer blend comprises from 3 to 25 wt. % of a modification agent that is an ethylene-based plastomer or elastomer. All individual values and subranges of a polymer blend comprising from 3 to 25 wt. % of an ethylene-based plastomer or elastomer are disclosed and included herein; for example, the polymer blend can comprise from 3 to 25 wt. %, from 5 to 25 wt. %, from 7 to 25 wt. %, from 10 to 25 wt. %, from 3 to 20 wt. %, from 5 to 20 wt. %, from 7 to 20 wt. %, from 10 to 20 wt. %, from 3 to 15 wt. %, from 5 to 15 wt. %, from 7 to 15 wt. %, from 10 to 15 wt. %, from 3 to 12 wt. %, from 5 to 12 wt. %, from 7 to 12 wt. %, or from 10 to 12 wt. % of an ethylene-based plastomer or elastomer, based on the total weight of the polymer blend.

In embodiments where the modification agent is an ethylene-based elastomer or plastomer, the ethylene-based elastomer or plastomer comprises from 10 to 45 percent by weight of units derived from one or more α-olefin comonomers. All individual values and subranges from 10 to 45 wt. % are included herein and disclosed herein; for example, the ethylene-based elastomer or plastomer may comprise from 10 to 40 wt. %, from 10 to 35 wt. %, from 10 to 30 wt. %, from 10 to 25 wt. %, from 10 to 20 wt. %, or 10 to 15 wt. % of units derived from one or more α-olefin comonomers. The α-olefin comonomers typically have no more than 20 carbon atoms. For example, the α-olefin comonomers may preferably have 3 to 10 carbon atoms, and more preferably 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, for example, be selected from the group consisting of propylene, 1-butene, 1-hexene, and 1-octene; or in the alternative, from the group consisting of 1-hexene and 1-octene.

In embodiments, the ethylene-based elastomer or plastomer comprises from 55 to 90 wt. % of units derived from ethylene. All individual values and subranges from 55 to 90 wt. % are included and disclosed herein; for example, the ethylene-based elastomer or plastomer may comprise from 55 to 90 wt. %, from 55 to 80 wt. %, from 55 to 70 wt. %, or from 55 to 60 wt. % of units derived from ethylene. The ethylene-based elastomer or plastomer is homogeneously branched, as described in the U.S. Pat. No. 3,645,992, incorporated herein by reference, or linear or substantially linear, as described in the U.S. Pat. Nos. 5,272,236 and 5,278,272, incorporated herein by reference.

In embodiments, the ethylene-based plastomer or elastomer has a density in the range of from 0.857 to 0.910 g/cm$^3$, where density can be measured according to ASTM D792. All individual values and subranges of a density of from 0.857 to 0.910 g/cm$^3$ are disclosed and included herein; for example, the ethylene-based plastomer or elastomer can have a density from the range of 0.857 to 0.910 g/cm$^3$, 0.860 to 0.900 g/cm$^3$, 0.860 to 0.890 g/cm$^3$, 0.860 to 0.880 g/cm$^3$, 0.860 to 0.870 g/cm$^3$, 0.870 to 0.910 g/cm$^3$, 0.870 to 0.900 g/cm$^3$, 0.870 to 0.890 g/cm$^3$, 0.870 to 0.880 g/cm$^3$, 0.880 to 0.910 g/cm$^3$, 0.880 to 0.900 g/cm$^3$, 0.880 to 0.890 g/cm$^3$, 0.890 to 0.910 g/cm$^3$, 0.890 to 0.900 g/cm$^3$, or 0.900 to 0.910 g/cm$^3$, where density can be measured according to ASTM D792.

In embodiments, the ethylene-based plastomer or elastomer has a melt index ($I_2$) in the range of from 0.50 to 50 g/10 minutes (g/10 min), where melt index ($I_2$) can be measured in accordance with ASTM D1238 (190° C./2.16 kg). All individual values and subranges of a melt index of from 0.50 to 50 g/10 min are disclosed and include herein; for example, the ethylene-based plastomer or elastomer can have a melt index of a lower limit of 0.50, 1, 2, 5, 10, 20, 30, or 40 g/10 min to an upper limit of 1, 2, 5, 10, 20, 30, 40, or 50 g/10 min, where melt index ($I_2$) can be measured in accordance with ASTM D1238 (190° C./2.16 kg).

Examples of commercially available ethylene-based plastomers or elastomers that can be used in some embodiments of the present invention include, ethylene-based plastomers or elastomers available from The Dow Chemical Company under the names ENGAGE™, and AFFINITY™, ethylene-based plastomers or elastomers available from ExxonMobil Chemical Co. under the name EXACT™, and ethylene-based plastomers or elastomers available from Mitsui under the name TAFMER™.

In embodiments, the ethylene-based plastomer or elastomer is an ethylene-based plastomer. In such embodiments, the ethylene-based plastomer has a density in the range of from 0.885 to 0.910 g/cm$^3$, where density can be measured according to ASTM D729. All individual values and subranges of a density from 0.885 to 0.910 g/cm$^3$ are disclosed and included herein; for example, the ethylene-based plastomer can have a density in the range of from 0.885 to 0.910 g/cm$^3$, 0.890 to 0.910 g/cm$^3$, 0.895 to 0.910 g/cm$^3$, 0.900 to 0.910 g/cm$^3$, 0.905 to 0.910 g/cm$^3$, or 0.890 to 0.900 g/cm$^3$, where density can be measured according to ASTM D729.

In embodiments, the ethylene-based plastomer or elastomer is an ethylene-based elastomer. In such embodiments, the ethylene-based elastomer has a density in the range of from 0.857 to 0.885 g/cm$^3$, where density can be measured according to ASTM D729. All individual values and subranges of a density from 0.857 to 0.885 g/cm$^3$ are disclosed and included herein; for example, the ethylene-based elastomer can have a density in the range of from 0.857 to 0.885 g/cm$^3$, 0.860 to 0.875 g/cm$^3$, 0.860 to 0.885 g/cm$^3$, 0.870 to 0.885 g/cm$^3$, 0.875 to 0.885 g/cm$^3$, or 0.880 to 0.885 g/cm$^3$, where density can be measured according to ASTM D729.

In embodiments, the ethylene-based elastomer has a molecular weight distribution ($M_w/M_n$) (measured according to the conventional GPC method) in the range of from 1.5 to 3.0, e.g. from 1.6 to 2.5.

In other embodiments, the modification agent is an ethylene-vinyl acetate. In such embodiments, the polymer blend comprises from 3 to 25 wt. % of an ethylene-vinyl acetate. All individual values and subranges of from 3 to 25 wt. % of an ethylene-vinyl acetate are disclosed and included herein; for example, the polymer blend can comprise from 3 to 25 wt. %, from 5 to 25 wt. %, from 7 to 25 wt. %, from 10 to 25 wt. %, from 3 to 20 wt. %, from 5 to 20 wt. %, from 7 to 20 wt. %, from 10 to 20 wt. %, from 3 to 15 wt. %, from 5 to 15 wt. %, from 7 to 15 wt. %, from 10 to 15 wt. %, from 3 to 12 wt. %, from 5 to 12 wt. %, from 7 to 12 wt. %, or from 10 to 12 wt. % of an ethylene-vinyl acetate, based on the total weight of the polymer blend.

In embodiments where the modification agent is an ethylene-vinyl acetate (EVA), the EVA can comprise from 7 to about 20 wt. % vinyl acetate. All individual values and subranges of from 7 to 20 wt. % are disclosed and included herein; for example, the EVA can comprise from 7 to 20 wt. %, 9 to 20 wt. %, 11 to 20 wt. %, 13 to 20 wt. %, 15 to 20 wt. %, 17 to 20 wt. %, 7 to 19 wt. %, 9 to 19 wt. %, 11 to 19 wt. %, 13 to 19 wt. %, 15 to 19 wt. %, 17 to 19 wt. %, 7 to 17 wt. %, 9 to 17 wt. %, 11 to 17 wt. %, 13 to 17 wt. %, 7 to 15 wt. %, 9 to 15 wt. %, 11 to 15 wt. %, 13 to 15 wt. %, 7 to 11 wt. %, 9 to 11 wt. %, or 7 to 9 wt. % of a vinyl acetate, based on the total weight of the EVA.

In embodiments, the EVA has a melt index ($I_2$) in the range of from 0.2 to 50 g/10 minutes (g/10 min), where melt index ($I_2$) can be measured in accordance with ASTM D1238 (190° C./2.16 kg). All individual values and subranges of a melt index of from 0.2 to 50 g/10 min are disclosed and include herein; for example, the EVA can have a melt index of a lower limit of 0.2, 0.5, 1, 2, 5, 10, 20, 30, or 40 to an upper limit of 10, 20, 30, 40, or 50 g/10 min, where melt index ($I_2$) can be measured in accordance with ASTM D1238 (190° C./2.16 kg).

Other Components of the Polymer Blend

In embodiments, the polymer blend can comprise further components, such as, one or more additives. Potential additives include, but are not limited to, antistatic agents, color enhancers, dyes, lubricants, fillers, pigments, primary antioxidants, secondary antioxidants, processing aids, UV stabilizers, anti-blocks, slip agents, tackifiers, fire retardants, anti-microbial agents, odor reducer agents, anti-fungal agents, and combinations thereof. The polymer blend can contain from 0.01 or 0.1 or 1 to 5, 10, 15 wt. % of such additives, based on the total weight of the polymer blend.

Films

A film is made from the polymer blend according to the embodiments described herein. Useful films according to embodiments of the present disclosure include cast, blown, and calendered (including multi-layer films, greenhouse films, shrink films including clarity shrink film, lamination film, biaxially-oriented film, extrusion coating, liners, clarity liners, overwrap film and agricultural film). Monolayer and multilayer films may be made according to the film and fabrication methods described in U.S. Pat. No. 5,685,128.

When formed into a film, the polymer blend of the present disclosure can be a more sustainable way of producing a film, and can also provide a number of other advantages. For example, while providing a sustainable formulation for forming a film, the films, in some embodiments of the present disclosure, maintain or minimize reduction of films properties such as elastic recovery, stiffness, or photodegradability. The advantages of a sustainable film with effective performance provides alternatives to existing film structures where, for example, elastic recovery is a desired property.

In embodiments, the film formed from the polymer blend has a thickness in the range of from 1 to 20 mils. All individual values and subranges of from 1 to 20 mils are disclosed and included herein; for example, the film formed from the polymer blend can have a thickness of from 1 to 20 mils, from 1 to 18 mils, from 1 to 16 mils, from 1 to 14 mils, from 1 to 12 mils, from 1 to 10 mils, from 1 to 8 mils, from 1 to 6 mils, 5 to 20 mils, from 5 to 18 mils, from 5 to 16 mils, from 5 to 14 mils, from 5 to 12 mils, from 5 to 10 mils, from 5 to 8 mils, from 5 to 6 mils, from 8 to 20 mils, from 8 to 18 mils, from 8 to 16 mils, from 8 to 14 mils, from 8 to 12 mils, from 8 to 10 mils, from 10 to 20 mils, from 10 to 18 mils, from 10 to 16 mils, from 10 to 14 mils, from 10 to 12 mils, from 12 to 20 mils, from 12 to 18 mils, from 12 to 16 mils, from 12 to 14 mils, from 14 to 20 mils, from 14 to 18 mils, from 14 to 16 mils, from 16 to 20 mils, from 16 to 18 mils, or from 18 to 20 mils.

In embodiments where the polymer blend comprises an ethylene-based plastomer or elastomer, the film formed from the polymer blend can exhibit a 1% secant modulus in the cross direction (CD) in a range of from 9,000 to 16,000 psi, when measured according to the test method described below. All individual values and subranges of a 1% secant modulus in the CD in a range of from 9,000 to 16,000 psi are disclosed and included herein; for example, the film formed from the polymer blend can have a 1% secant modulus in the CD in a range of from 9,000 to 16,000 psi, 10,000 to 16,000 psi, 11,000 to 16,000 psi, 12,000 to 16,000 psi, 13,000 to 16,000 psi, 14,000 to 16,000 psi, 15,000 to 16,000 psi, 9,000 to 15,000 psi, 10,000 to 15,000 psi, 11,000 to 15,000 psi, 12,000 to 15,000 psi, 13,000 to 15,000 psi, 14,000 to 15,000 psi, 9,000 to 14,000 psi, 10,000 to 14,000 psi, 11,000 to 14,000 psi, 12,000 to 14,000 psi, 13,000 to 14,000 psi, 9,000 to 13,000 psi, 10,000 to 13,000 psi, 11,000 to 13,000 psi, 12,000 to 13,000 psi, 9,000 to 12,000 psi, 10,000 to 12,000 psi, 11,000 to 12,000 psi, 9,000 to 11,000 psi, 10,000 to 11,000 psi, or 9,000 to 10,000 psi, when measured according to the test method described below.

In embodiments where the polymer blend comprises an ethylene-based plastomer or elastomer, the film formed from the polymer blend can exhibit a 1% secant modulus in the machine direction (MD) in a range of from 9,000 to 14,800 psi, when measured according to the test method described below. All individual values and subranges of a 1% secant modulus in the MD in a range of from 9,000 to 14,800 psi are disclosed and included herein; for example, the film formed from the polymer blend can have a 1% secant modulus in the MD in a range of from 9,000 to 14,800 psi, 10,000 to 14,800 psi, 11,000 to 14,800 psi, 12,000 to 14,800 psi, 13,000 to 14,800 psi, 14,000 to 14,800 psi, 9,000 to 14,000 psi, 10,000 to 14,000 psi, 11,000 to 14,000 psi, 12,000 to 14,000 psi, 13,000 to 14,000 psi, 9,000 to 13,000 psi, 10,000 to 13,000 psi, 11,000 to 13,000 psi, 12,000 to 13,000 psi, 9,000 to 12,000 psi, 10,000 to 12,000 psi, 11,000 to 12,000 psi, 9,000 to 11,000 psi, 10,000 to 11,000 psi, or 9,000 to 10,000 psi, when measured according to the test method described below.

In embodiments where the polymer blend comprises an ethylene-vinyl acetate, the secant modulus at 1% can be maintained, and there is not a significant reduction in secant modulus even in the presence of the PCR and/or ethylene-vinyl acetate.

In embodiments, the film formed from the polymer blend of the present disclosure exhibits a peak load in the cross direction (CD) of less than 17.5 lbf at 13 mil thickness, when measured according to the test method described below. All individual values and subranges of less than 17.5 lbf at 13 mil thickness are disclosed and included herein; for example, the film formed from the polymer blend can have a peak load in the CD of less than 17.5 lbf, less than 17.0 lbf, or less than 16.5 lbf at 13 mil thickness, or a peak load in the CD in the range of from 12 to 17.5 lbf, from 12 to 17 lbf, from 14 to 17.5 lbf, from 14 to 17 lbf, from 15 to 17 lbf, from 16 to 17.5 lbf, or from 16 to 17 lbf at 13 mil thickness, where peak load in the CD is measured according to the test method described below.

In embodiments, the film formed from the polymer blend of the present disclosure exhibits a percent of peak load achieved in the cross direction (CD) at 0 seconds (s) of the second hold of greater than 23.5%, when measured according to the test method described below. All individual values and subranges of greater than 23.5% are included and disclosed herein; for example, the film formed from the polymer blend can have a percent of peak load in the CD at 0 seconds (s) of the second hold of greater than 23.5%, greater than 24.0%, greater than 25.0%, greater than 26.0%, greater than 27.0%, greater than 28.0%, or greater than 28.5%, or a percent of peak load in the CD at 0 seconds (s) of the second hold of from 23.5% to 40.0%, from 23.5% to 35.0%, from 23.5% to 30.0%, from 23.5% to 25.0%, from 25.0% to 40.0%, from 25.0% to 35.0%, from 25.0% to 30.0%, from 28.5% to 40.0%, from 28.5% to 35.0%, or from 28.5% to 30.0%, when measured in accordance with the test method described below.

In embodiments, the film formed from the polymer blend of the present disclosure exhibits a percent of peak load achieved in the cross direction (CD) at 1 second (s) of the second hold of greater than 31.0%, when measured according to the test method described below. All individual values and subranges of greater than 31.0% are included and disclosed herein; for example, the film formed from the polymer blend can have a percent of peak load in the CD at 1 second (s) of the second hold of greater than 31.0%, greater than 32.0%, greater than 33.0%, greater than 34.0%, or greater than 35.0%, or a percent of peak load at 1 second (s) of the second hold of from 31.0% to 45.0%, from 31.0% to 40.0%, from 31.0% to 35.0%, from 32.0% to 45.0%, from 32.0% to 40.0%, from 32.0% to 36.0%, from 33.0% to 45.0%, from 33.0% to 40.0%, from 33.0% to 36.0%, or from 34.0% to 36.0%, when measured in accordance with the test method described below.

In embodiments, the film formed from the polymer blend of the present disclosure exhibits a percent of peak load achieved in the cross direction (CD) at 2 seconds (s) of the second hold of greater than 33.0%, when measured according to the test method described below. All individual values and subranges of greater than 33.0% are included and disclosed herein; for example, the film formed from the polymer blend can have a percent of peak load in the CD at 2 seconds (s) of the second hold of greater than 33.0%, greater than 34.0%, greater than 35.0%, greater than 36.0%, or greater than 37.0%, or a percent of peak load in the CD at 2 seconds (s) of the second hold of from 33.0% to 45.0%, from 33.0% to 40.0%, from 33.0% to 38.0%, from 35.0% to 45.0%, from 35.0% to 40.0%, from 35.0% to 38.0%, from 36.0% to 45.0%, from 36.0% to 40.0%, from 36.0% to 38.0%, or from 37.0% to 38.0%, when measured in accordance with the test method described below.

In embodiments, the film formed from the polymer blend of the present disclosure exhibits a percent of peak load achieved in the cross direction (CD) at 5 seconds (s) of the second hold of greater than 36.0%, when measured according to the test method described below. All individual values and subranges of greater than 36.0% are included and disclosed herein; for example, the film formed from the polymer blend can have a percent of peak load in the CD at 5 seconds (s) of the second hold of greater than 36.0%, greater than 36.5%, greater than 37.0%, greater than 38.0%, or greater than 39.0%, or a percent peak load in the CD at 5 seconds (s) of the second hold of from 36.0% to 45.0%, from 36.0% to 40.0%, from 36.0% to 39.0%, from 37.0% to 45.0%, from 37.0% to 40.0%, from 37.0% to 38.0%, from 37.0% to 39.0%, from 38.0 to 45.0%, from 38.0% to 43.0%, or from 38.0% to 40.0%, when measured in accordance with the test method described below.

In embodiments, the film formed from the polymer blend of the present disclosure exhibits a percent of peak load achieved in the cross direction (CD) at 10 seconds (s) of the second hold of greater than 38.0%, when measured according to the test method described below. All individual values and subranges of greater than 38.0% are included and disclosed herein; for example, the film formed from the polymer blend can have a percent of peak load in the CD at 10 seconds (s) of the second hold of greater than 38.0%, greater than 39.0%, greater than 40.0%, or greater than 40.5%, or a percent of peak load in the CD at 10 seconds (s) of the second hold of from 38.0% to 50.0%, from 38.0% to 45.0%, from 38.0% to 42.0%, from 39.0% to 50.0%, from 39.0% to 45.0%, from 39.0% to 42.0%, or from 39.0% to 41.0%, when measured in accordance with the test method described below.

In embodiments, the film formed from the polymer blend of the present disclosure exhibits a percent (%) strain at break at 100 light hours of greater than 100%, when measured in accordance with the test method described below. All individual values and subranges of greater than 100% are disclosed and included herein; for example, the polymer blend can exhibit a % strain at break at 100 light hours of greater than 100%, greater than 150%, greater than 200%, greater than 250%, greater than 300%, greater than 350%, greater than 400%, or greater than 450%, or a % strain at break at 100 light hours in a range of from 100% to 700%, from 100% to 600%, from 100% to 500%, from 100% to 450%, from 100% to 400%, from 100% to 350%, from 100% to 300%, from 100% to 250%, from 100% to 200%, or from 100% to 150%, where % strain at break at 100 light hours can be measured in accordance with the test method described below.

In embodiments, the film formed from the polymer blend of the present disclosure exhibits a percent (%) strain at break at 100 light hours of greater than 100% and a % strain at break at 292 light hours of less than 20%, when measured in accordance with the test method described below. All individual values and subranges of less than 20% are disclosed and included herein; for example, the polymer blend can exhibit a % strain at break at 100 light hours of greater than 100% and a % strain at break at 292 light hours of less than 20%, less than 18%, less than 12%, less than 10%, or less than 8%, or a % strain at break at 292 light hours in a range of from 5% to 20%, 8% to 20%, 10% to 20%, 12% to 20%, or 15% to 20%, where % strain at break at 292 light hours can be measured in accordance with the test method described below.

The film according to embodiments of the present disclosure can maintain its structural integrity for up to or around 100 light hours or longer and can achieve photodegradation at or around 292 light hours.

In embodiments, the film is a monolayer film. In such embodiments, the components of the polymer blend are blended with one another and optional other components (e.g., other polymers or additives) in any conventional manner (e.g., dry blending the individual components and subsequently melt mixing either directly in the extruder to make the film or pre-melt mixing in a separate extruder, and fabricating into a film using any film producing process, such as blown film or cast film).

In embodiments, the film can contain a carbon monoxide level of greater than 0.1 wt. %. For example, the film can contain a carbon monoxide level of greater than 0.1, 0.2, 0.5, or 1.0 wt. %. In further embodiments, the film can contain an amyl group (C5) level greater than, or equal to, 0.1 amyl group per 1000 carbon atoms, as determined by $^{13}C$ NMR. For example, the film can contain an amyl group (C5) level greater than, or equal to, 0.1, 0.2, 0.3, 0.4 or 0.5 amyl group per 1000 carbon atoms, as determined by $^{13}C$ NMR.

The films according to embodiments of the present disclosure have many utilities and can be formed into a variety of articles. For examples, the films according to embodiments of the present disclosure can be over-wrapping films such as tissue over-wraps, bundled bottled water over-wraps; clarity films such as candy bags, bread bags, envelope window films; food and specialty packaging films, such as produce bags, meat wraps, cheese wraps, beverage holders; and pouches such as milk pouches or bags-in-box such as wine.

As noted above, the films of this invention may be made by conventional fabrication techniques, e.g. simple bubble extrusion, biaxial orientation processes (such as tenter frames or double bubble processes), simple cast/sheet extrusion, co-extrusion, lamination, etc.

Extrusion coating is another technique for producing films. Similar to cast film, extrusion coating is a flat die technique. A film can be extrusion coated or laminated onto a substrate either in the form of a monolayer or a coextruded film.

TEST METHODS

Density

Density is measured in accordance with ASTM D792, and expressed in grams/cm$^3$ (g/cm$^3$).

Melt Index (I2)

Melt Index is measured in accordance with ASTM D 1238-10 at 190 Celsius and 2.16 kg, Method B, and is expressed in grams eluted/10 minutes (g/10 min).

Photodegradability

Photodegradability is measured in accordance with ASTM D3826-18. Five specimens per example at a given time are tested, and corresponding averages and standard deviations are calculated therefrom.

Elastic Recovery 4 inch×1 inch specimens of the example films are prepared. Specimens are placed in an Instron with a 2 inch gage length. Specimens are first elongated to 100% strain at 20 inch/min and held for 15 seconds (s). They are then returned to 75% strain at 20 inch/min and the load is monitored for 90 s after the return to 75% strain. The load on the specimen from 0 s to 90 s of the second hold is normalized by the maximum load achieved by the specimen to give a % recovery of maximum load at each given time. This value is an indicator of a specimen's ability to recover elastically.

Secant Modulus 6 inch×1 inch samples are prepared and placed in an Instron with a 4 inch gage length. The sample is elongated at 2 inch/min and the secant modulus is calculated at 1% tensile strain. Five samples per example are tested, and corresponding averages and standard deviations are calculated therefrom.

DSC Method

Differential scanning calorimetry (DSC) is a common technique that can be used to examine the melting and crystallization of semi-crystalline polymers. General principles of DSC measurements and applications of DSC to studying semi-crystalline polymers are described in standard texts (e.g., E. A. Turi, ed., Thermal Characterization of Polymeric Materials, Academic Press, 1981).

DSC analysis is determined using DSC from TA Instruments, Inc. Calibration of the DSC is done as follows. First, the instrument baseline needs to be calibrated using a standard procedure for the DSC. Then about 5-7 milligrams of a fresh indium sample is analyzed by heating the sample to 180° C., cooling the sample to 140° C. at a cooling rate of 10° C./min followed by keeping the sample isothermally at 140° C. for 1 minute, followed by heating the sample from 140° C. to 180° C. at a heating rate of 10° C./min. The heat of fusion and the onset of melting of the indium sample are determined and checked to be within 0.5° C. from 156.6° C. for the onset of melting and within 0.5 J/g from 28.57 J/g for the heat of fusion.

The polymer samples are pressed into a thin film at a temperature of 190° C. About 5 to 8 mg of sample is weighed out and placed in the DSC pan. The lid is crimped on the pan to ensure a closed atmosphere. The sample pan is placed in the DSC cell and heated at a high rate of about 100° C./min to a temperature of 190° C. The sample is kept at this temperature for about 3 minutes. Then the sample is cooled at a rate of 10° C./min to −40° C., and kept isothermally at that temperature for 3 minutes. Consequently the sample is heated at a rate of 10° C./min to 170° C. This step is designated as the 2nd heating. The resulting enthalpy curves are analyzed for peak melt temperature, onset and peak crystallization temperatures, and the heat of fusion (also known as heat of melting), $\Delta H_f$. The heat of fusion, in Joule/gram, is measured by integrating the area under the melting endotherm (second heat) from −20° C. to the end of melting by using a linear baseline. The heat of fusion of 100% crystalline polyethylene is taken to be 292 Joules/gram (J/g) to calculate the wt. % crystallinity.

EXAMPLES

The following materials are used in the examples.

AVANGARD™ NATURA PCR-LDPCR-150 ("AVANGARD™ 150") is a PCR commercially available from Avangard Innovative LP (Houston, Texas). AVANGARD™ 150 includes LDPE and LLDPE, and as a PCR, each batch number, lot number, and resin can have a different heat of fusion (J/g from DSC) and peak melting temperature (Tm). The heat of fusion of AVANGARD™ 150 falls within the range of from 130 to 170 J/g and peak melting temperature (Tm) of AVANGARD™ 150 falls within the range of from 105° C. to 127° C.

DOW™ 458I Low Density Polyethylene Resin (or DOW™ 458I) is an ECO copolymer commercially available from The Dow Chemical Company (Midland. MI) having a target melt index ($I_2$) of 0.52 g/10 minutes and a target density of 0.930 g/cm$^3$.

DOW™ LDPE 959s Low Density Polyethylene Resin (or DOW™ 959s) is a low density polyethylene commercially available from The Dow Chemical Company (Midland, MI) having a target melt index ($I_2$) of 55 g/10 minutes and a density of 0.923 g/cm$^3$.

ENGAGE™ 8200 is an ethylene-based elastomer commercially available from The Dow Chemical Company (Midland, MI). In particular, ENGAGE™ 8200 is an ethylene/octene elastomer having a target density of 0.870 g/cm$^3$, a target melt index ($I_2$) of 5 g/10 minutes, a DSC melting peak of approximately 59° C., a Mw from GPC (conventional) of around 72,000 to 73,000 daltons or g/mol, and a molecular weight distribution (Mw/Mn) of approximately 2.2.

ELVAX™ 440 is an ethylene-vinyl acetate commercially available from The Dow Chemical Company (Midland, MI). ELVAX™ 440 has a melt index of 30 g/10 min and has a vinyl acetate content of from 17 to 19 wt. %.

Film Formation

The examples are formed into films as follows. The formulated blends, as described below, are compounded into pellets using a Haake Micro-18 twin screw extruder (SN 44039) with a mild mixing screw, and temperatures of 140° C. at the feed throat and 200° C. at the die. The pellets were then fabricated into 7.5 inch wide rolls of 13 mil monolayer cast films using a Collin Line using a standard 30 mm 30 L/D screw, a die gap of 25 mils, a temperature of 250° C. at the die, an air gap of 1.5 in, and a temperature of 25° C. for the chill roll.

Comparative Example 1 is a film formed from a polymer blend of 55 wt. % AVANGARD™ 150, 30 wt. % DOW™ LDPE 458I Low Density Polyethylene Resin, and 15 wt. % DOW™ LDPE 959S Low Density Polyethylene Resin. Inventive Example 1 is a film formed from a polymer blend of 55 wt. % AVANGARD™ 150, 25 wt. % DOW™ LDPE 458I Low Density Polyethylene Resin, and 15 wt. % DOW™ LDPE 959S Low Density Polyethylene Resin, and 5 wt. % ENGAGE™ 8200. Inventive Example 2 is a film formed from a polymer blend of 55 wt. % AVANGARD™ 150, 25 wt. % DOW™ LDPE 458I Low Density Polyethylene Resin, and 10 wt. % DOW™ LDPE 959S Low Density Polyethylene Resin, and 10 wt. % ENGAGE™ 8200. Inventive Example 3 is a film formed from a polymer blend of 55 wt. % AVANGARD™ 150, 25 wt. % DOW™ LDPE 458I Low Density Polyethylene Resin, and 20 wt. % ELVAX™ 440. Table 1 below provides the composition of the polymer blend of the film examples in terms of components (i), (ii) and (iii), as described above.

TABLE 1

Formulated Films from Polymer Blends

| Example # | Component (i) | Component (ii) | Component (iii) |
|---|---|---|---|
| Comparative Ex. 1 | 55 wt. % AVANGARD ™ 150 | 30 wt. % DOW ™ 458I & 15 wt. % DOW ™ 959S | N/A |
| Inventive Ex. 1 | 55 wt. % AVANGARD ™ 150 | 25 wt. % DOW ™ 458I & 15 wt. % DOW ™ 959S | 5 wt. % ENGAGE ™ 8200 |
| Inventive Ex. 2 | 55 wt. % AVANGARD ™ 150 | 25 wt. % DOW ™ 458I & 10 wt. % DOW ™ 959S | 10 wt. % ENGAGE ™ 8200 |
| Inventive Ex. 3 | 55 wt. % AVANGARD ™ 150 | 25 wt. % DOW ™ 458I | 20% wt. % ELVAX ™ 440 |

The elastic recovery of the films is measured in accordance with the test method described above. Table 2 shows the results.

TABLE 2

Elastic Recovery as % Recovery of Maximum Load in Cross Direction (CD)

| Example # | Peak Load CD (lbf) | % of Peak load CD at 0 s of $2^{nd}$ hold | % of Peak load CD at 1 s of $2^{nd}$ hold | % of Peak load CD at 2 s of $2^{nd}$ hold | % of Peak load CD at 5 s of $2^{nd}$ hold | % of Peak load CD at 10 s of $2^{nd}$ hold |
|---|---|---|---|---|---|---|
| Comparative Ex. 1 | 18.3 | 21.5% | 29.4% | 31.8% | 34.5% | 36.3% |
| Inventive Ex. 1 | 16.9 | 27.2% | 34.2% | 36.0% | 38.4% | 39.8% |
| Inventive Ex. 2 | 16.1 | 28.9% | 35.3% | 37.3% | 39.5% | 40.9% |

The secant modulus of the films is measured at 1% at both the cross direction (CD) and machine direction (MD) in accordance with the test method described above. Table 3 provides the results.

TABLE 3

Secant Modulus at 1%

| Example # | Average 1% Secant Modulus (PSI) for CD | Standard Deviation 1% Secant Modulus (PSI) for CD | Average 1% Secant Modulus (PSI) for MD | Standard Deviation 1% Secant Modulus (PSI) for MD |
|---|---|---|---|---|
| Comparative Ex. 1 | 16,850 | 537 | 15,433 | 565 |
| Inventive Ex. 1 | 14,983 | 771 | 15,099 | 1012 |
| Inventive Ex. 2 | 13,687 | 569 | 12,568 | 677 |
| Inventive Ex. 3 | 17,265 | 681 | 15,442 | 313 |

The photodegradation is measured in accordance with the test method described above. Table 4 shows the results in % strain at break with average (Ave.) and standard deviation (St. Dev.) at 0, 100, 172, 247, and 292 light hours.

TABLE 4

Photodegradation Data

% Strain at Break

| Example # | 0 light hours | | 100 light hours | | 172 light hours | | 247 light hours | | 292 light hours | |
|---|---|---|---|---|---|---|---|---|---|---|
| | Ave. | St. Dev. | Ave. | St. Dev. | Ave. | St. Dev. | Ave. | St. Dev. | Ave. | St. Dev. |
| Compar. Ex. 1 | 549% | 12% | 70% | 17% | 16% | 4% | 6% | .5% | 5% | 2% |
| Inventive Ex. 1 | 389% | 175% | 489% | 34% | 37% | 12% | 15% | 5% | 12% | 3% |

Every document cited herein, if any, including any cross-referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

We claim:

1. A film made from a polymer blend, the polymer blend comprising: (i) from 10 to 70 wt. % of a post-consumer resin (PCR), wherein the PCR comprises low density polyethylene and linear low density polyethylene, has a heat of fusion in the range of from 130 to 170 J/g, has a peak melting temperature (Tm) from 105° C. to 127° C.; (ii) from 10 to 87 wt. % of a low density polyethylene, an ethylene/carbon monoxide copolymer (ECO copolymer), or a combination thereof; and (iii) from 3 to 25 wt. % of a modification agent; wherein the modification agent is an ethylene-based plastomer or elastomer, an ethylene-vinyl acetate, or a combination thereof.

2. The film of claim 1, wherein the modification agent is an ethylene-based plastomer or elastomer having a density in the range of from 0.857 to 0.910 g/cm$^3$.

3. The film of claim 1, wherein the modification agent is an ethylene-vinyl acetate.

4. The film of claim 1, wherein (ii) is from 10 wt. % to 87 wt. % of an ECO copolymer.

5. The film of claim 1, wherein (ii) is from 10 wt. % to 87 wt. % of a low density polyethylene.

6. The film of claim 1, wherein (ii) is a combination of from 1 to 99 wt. % of a low density polyethylene and from 1 to 99 wt. % of an ECO copolymer, based on the total weight percent of the combination.

7. The film of claim 1, wherein the film has a thickness of from 1 to 20 mils.

8. The film of claim 1, wherein the film is in the form of an unitizing film, a shrink film, a lamination film, a liner film, a consumer bag, an agriculture film, a food packaging film, a beverage packaging film, or a shipping sack.

9. The film of claim 1, wherein the polymer blend comprises: from 7 to 25 wt. % of the modification agent.

* * * * *